United States Patent [19]

Ishikawa

[11] Patent Number: 4,911,457
[45] Date of Patent: Mar. 27, 1990

[54] SCOOTER

[76] Inventor: Takeshi Ishikawa, 420 E. 80th St. Suite 8L, New York, N.Y. 10021

[21] Appl. No.: 323,471

[22] Filed: Mar. 14, 1989

[51] Int. Cl.⁴ .............................................. B62K 23/06
[52] U.S. Cl. ..................................... 280/240; 280/245; 74/88
[58] Field of Search ............... 280/245, 241, 255, 254, 280/242.1, 240, 247; 74/130, 31, 88, 133, 141.5

[56] References Cited

U.S. PATENT DOCUMENTS 1,443,904  1/1923  Parsons ........................... 280/254 X

FOREIGN PATENT DOCUMENTS 453544  5/1950  Italy ............................. 280/242.1 X Primary Examiner—Charles A. Marmor
Assistant Examiner—Alan M. Kagen
Attorney, Agent, or Firm—Kanesaka and Takeuchi

[57] ABSTRACT

A scooter with a manual propelling system of the invention can be moved by pushing or kicking the ground as usual, operating the manual propelling sytem or combining the both methods. The scooter comprises a body or platform, a steering section attached to the body and a prpelling section. The steering section includes a front shaft rotatably attached to the body, at least one front wheel rotationally connected to a lower portion of the front shaft, and a steering rod. A middle portion of the steering rod is rotationally connected to an upper portion of the front shaft. The propelling section includes a rear wheel shaft rotationally attached to the body, rear wheels fixed to the rear wheel shaft, an engaging device connected to the rear wheel shaft, and a drive shaft connected to a lower portion of the steering rod. The drive shaft is provided with a rack engaging the engaging device. When the drive shaft is moved forwardly by pulling the steering rod downwardly, the rack engages the engaging device to rotate the rear wheel to move the scooter forwardly.

6 Claims, 3 Drawing Sheets

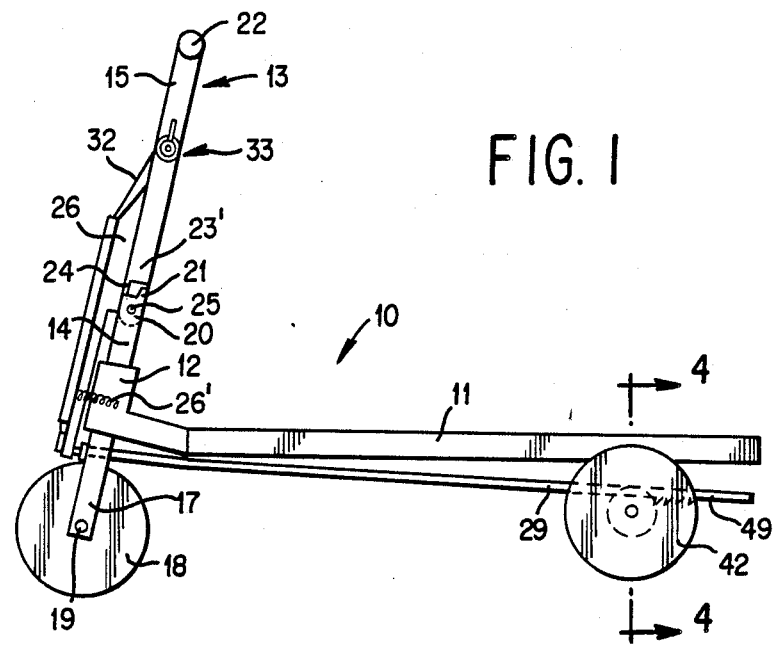
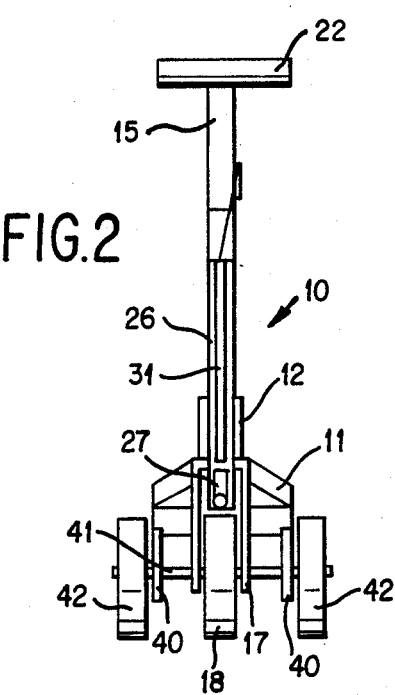
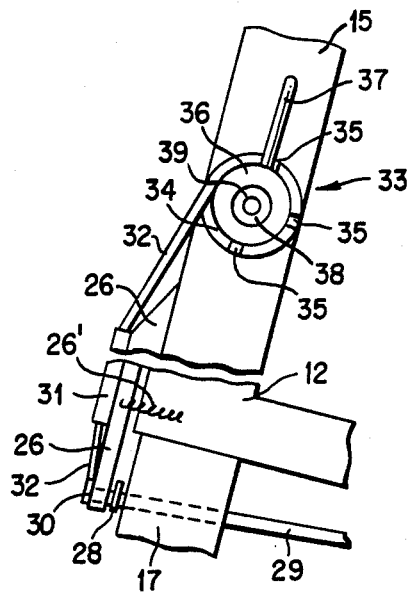

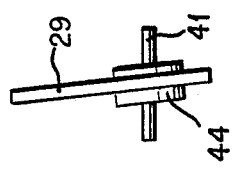
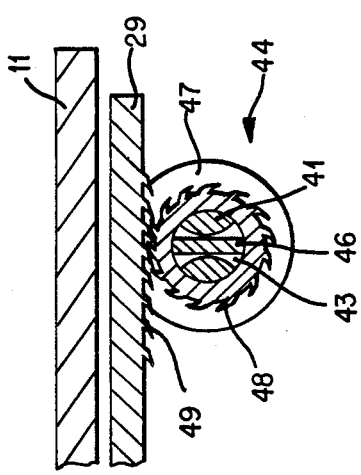
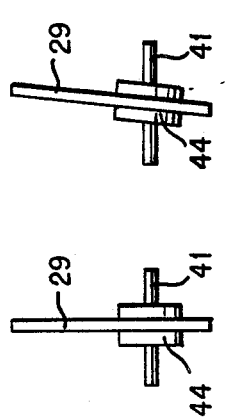
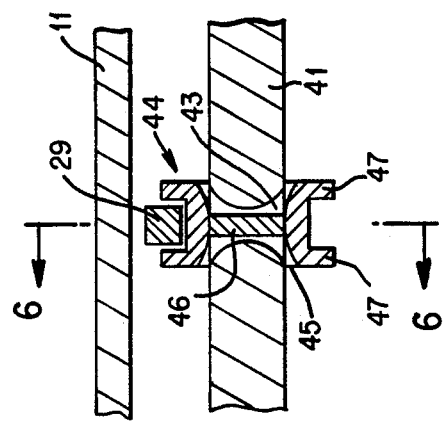

SCOOTER

BACKGROUND OF THE INVENTION AND RELATED ART STATEMENT

The present invention relates to a scooter with a manual propelling system for running the scooter by the manual propelling system as well as a pushing or kicking force generally made.

Conventionally, a scooter is provided with a plurality of wheels, and is moved forwardly on a flat ground by pushing or kicking the ground. This kind of scooter is popular and has been used for a long period of time. However, the problem of this popular scooter is that whenever the scooter is started to move or speed is increased, a user must push or kick the ground.

In this respect, small vehicles or carriages having manual propelling system are known. For example, in U.S. Pat. No. 980,092, when an operation lever is pulled, a belt connected to an axle of wheels through a one way clutch is pulled to thereby move the vehicle forwardly. In British Patent No. 106,128, when a lever is pulled, a chain connected to a sprocket with a one way clutch is pulled, so that the vehicle is moved.

The conventional small vehicle with a manual propelling system as explained above utilizes many parts, such as a one way clutch, a chain or belt, and a spring for returning the chain or belt. In a small vehicle, it is desirable to simplify the structure.

Accordingly, one object of the present invention is to provide a scooter having a manual propelling system which is simple in structure.

Another object of the invention is to provide a scooter as stated above, wherein the scooter can be moved by pushing the same, operating the manual propelling system or combination of the two.

A further object of the invention is to provide a scooter as stated above, wherein a force applied to the manual propelling system when operating the manual propelling system can be varied.

Further objects and advantages of the invention will be apparent from the following description of the invention.

SUMMARY OF THE INVENTION

A scooter of the present invention is provided with a manual propelling system, wherein the scotter may be moved by pushing or kicking the ground as usual, operating the manual propelling system or combining the two methods.

The scooter comprises a body where a user stands, a steering section attached to the body, and a propelling section. The steering section includes a front shaft rotationally attached to the body, at least one front wheel rotationally connected to a lower portion of the front shaft, and a steering rod. A middle portion of the steering rod is rotationally connected to an upper portion of the front shaft.

The propelling section includes a rear wheel shaft with rear wheels rotationally attached to the body, an engaging device connected to the rear wheel shaft, and a drive shaft connected to a lower portion of the steering rod and having a rack. When the drive shaft is moved forwardly by pulling the steering rod downwardly, the rack engages the engaging device to rotate the rear wheels. Consequently, the scooter moves forwardly without kicking the ground. The rack engages the engaging device only when the drive shaft is moved forwardly.

The engaging device includes a gear pivotally connected to the rear wheel shaft so that an angle of the gear relative to the rear wheel shaft can be changed to allow the gear to align perpendicular to the drive shaft. Namely, even if the position of the drive shaft relative to the longitudinal direction of the body is slightly changed, an angle of the gear relative to the rear wheel shaft changes to align relative to the drive shaft.

The scooter further includes speed and force adjusting means attached to the steering rod. The propelling force applied to the scooter and speed of the scooter are adjusted by changing the position of the drive shaft on the steering rod.

BRIEF DESCRIPTION OF THE DRAWINGS

FIG. 1 is a side view of a scooter of the present invention;

FIG. 2 is an explanatory front view of a scooter of the present invention;

FIG. 3 is an explanatory enlarged side view for showing speed adjusting means of the scooter;

FIG. 4 is an enlarged section view taken along line 4—4 in FIG. 1;

FIGS. 5(a)–5(c) are explanatory views for showing relationship of a gear drive shaft of the invention; and FIG. 6 is a section view taken along line 6—6 in FIG. 4.

DETAILED DESCRIPTION OF A PREFERRED EMBODIMENT

Figure 7:
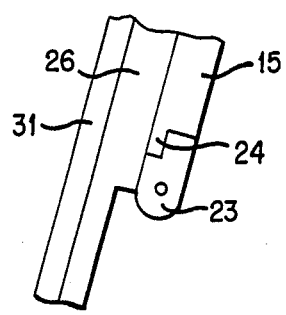
FIG. 7 is an enlarged side view of a part of a steering section.

Referring to FIGS. 1 and 2, a scooter 10 in accordance with the present invention is shown in the form of a tricycle. The scooter 10 of the invention comprises a platform or body 11 having a bearing 12 at a front portion thereof, and a steering section 13. The steering section 13 includes a front shaft 14 rotationally situated in the bearing 12, and a rod 15 rotationally connected at a middle portion 23' to the front shaft 14.

The front shaft 14 is divided, at the lower portion thereof, into two parts 17 parallel to each other, between which a front wheel 18 is rotationally retained by means of a shaft 19. The front shaft 14 is also provided with bifurcated top portions 20 with projections 21. Namely, a slit is formed at the top of the shaft 14 to form the bifurcated top portions 20.

The rod 15 is provided with a handle 22 at a top portion, and a thin projection 23 (FIG. 7) with side flanges 24 at a lower portion thereof. When the front shaft 14 and rod 15 are assembled, the projection 23 is situated between the bifurcated top portions 20 of the front shaft 14 and is rotationally connected together by a shaft 25. Namely, the rod 15 can bend or turn relative to the front shaft 14. Since the side flanges 24 abut against the top of the front shaft 14, the rod 15 does not turn in the counter clockwise direction beyond the straight position relative to the front shaft 14, as shown in FIG. 1. On the other hand, the projections 21 and side flanges 24 prevent the rod 15 to turn in clockwise direction beyond the a predetermined lower position. When the rod 15 is rotated with respect to the longitudinal axis thereof, the shaft 14 is rotated as well together with the rod 15.

A rod 26 is fixed to the rod 15 to extend downwardly therefrom. A lower portion of the rod 26 is situated slightly away from the front shaft 14 and the bearing 12, and terminates above the front wheel 18. The rod 26 is provided with a slit 27 at a lower end, in which a drive shaft 29 is situated. Since the drive shaft 29 is provided with an enlarged portion 30 at an end and a retaining member 28 adjacent the rod 26, the drive shaft 29 may slide in the slit 27 but does not disengage from the rod 26 even if the drive shaft 29 is moved back and fourth.

Springs 26' are situated between a lower portion of the rod 26 and an outer portion of the bearing 12 to urge the rod 26 to be located adjacent to the bearing 12. As a result, when the rod 15 is pulled, the rod 15 together with the rod 26 may rotate relative to the shaft 25. However, when no force is applied to the rod 15, the rod 15 together with the rod 26 is retained at an upright position as shown in FIG. 1.

Attached to the rod 26 is a hollow tube 31, through which a wire 32 passes. A lower end of the wire 32 is firmly connected to the enlarged portion 30 of the drive shaft 29, while an upper end is attached to an adjusting device 33 attached to the rod 15.

The adjusting device 33 comprises a base 34 having dents 35 on an outer portion thereof, a cylindrical member 36 with a lever 37, and a washer 38. The adjusting device 33 is attached to the rod 15 by means of a shaft 39. When the adjusting device 33 is assembled, the cylindrical member 36 is pushed toward the base 34 by means of a spring (not shown) situated between the cylindrical member 36 and the washer 38. Therefore, the lever 37 may engage the dents 35.

An upper end of the wire 32 is attached to the cylindrical member 36. Therefore, when the lever 37 is rotated relative to the shaft 39, the wire 32 is pulled or wound around the cylindrical member 36. As a result, position of the lower end of the wire 32 can be regulated. When the lever 37 engages one of the dents 35, the cylindrical member 36 does not accidentally rotate around the shaft 39. Accordingly, the lower end of the wire 32 can be fixed at a desired position.

The body 11 is provided with flanges 40 (FIG. 2), through which a rear shaft 41 extends. Rear wheels 42 are fixed to the rear shaft 41. The rear shaft 41 is provided with a through hole 43, which has a narrow center portion and side peripheral portions as shown in FIGS. 4 and 6. Namely, when a shaft is located in the hole 43, the shaft can pivot inside the hole 43.

Attached to the rear shaft 41 is a gear 44 having a central opening 45, which is narrow in center portion and wide in peripheral portions as shown in FIGS. 4 and 6. The gear 44 is attached to the rear shaft 41 by a pin 46 passing through the hole 43. Consequently, the gear 44 can not slide or rotate relative to the rear shaft 41, but can incline or tilt relative to the rear shaft 41.

The gear 44 has outer flanges 47 and teeth 48 extending radially outwardly and inclining in one direction around the periphery thereof. The drive shaft 29 is provided with teeth 49 extending downwardly and inclining toward the front wheel 18. The drive shaft 29 is situated above the teeth 48 of the gear 44 between the flanges 47. Therefore, when the drive shaft 29 is pulled toward the front wheel 18, the teeth 49 engage the teeth 48 of the gear 44 to thereby rotate the rear shaft 41 to move the scooter 10 forwardly.

The teeth 49 are formed on one part of the drive shaft 29 so that when the drive shaft 29 is situated at a rear end position, the teeth 49 do not contact the teeth 48 of the gear 44. Also, when the drive shaft 29 is moved to a forward end position, the teeth 49 do not contact the teeth 48 as well. Consequently, unnecessary contact between the teeth 48, 49 is prevented.

In the scooter 10, when the handle 22 is oriented forwardly and is pulled, the drive shaft 29 moves forwardly in the condition as shown in FIG. 5(a). Namely, the axes of the gear 44 and rear shaft 41 align. When the handle 22 is turned rightwardly, the drive shaft 29 inclines relative to the rear shaft 41, wherein when the handle 22 is pulled, the gear 44 inclines relative to the rear shaft 41 along the drive shaft 29, as shown in FIG. 5(b). The gear 44 is rotated by the drive shaft 29 while the inclination angle of the gear 44 relative to the rear shaft 41 remains as it is. On the other hand, when the handle 22 is turned leftwardly and is pulled, the gear 44 inclines relative to the rear shaft 41, as shown in FIG. 5(c) and rotates while the inclination angle of the gear 44 relative to the rear shaft 41 remains as it is. Namely, the teeth 49 of the drive shaft 29 completely engage the teeth 48 of the gear 44 in any direction of the handle 22 by changing the inclination angle of the gear 44.

When the scooter 10 is used, a user holds the handle 22 and may use the scooter 10 as usual. In case the handle 22 is pulled to bend relative to the front shaft 14, the drive shaft 29 is moved forwardly. As a result, the teeth 49 of the drive shaft 29 engage the teeth of the gear 44 to rotate the rear shaft 41. Consequently, the scooter 10 moves forwardly. The handle 22 returns to the upright position by means of the springs 26'.

In the scooter 10, when the lever 37 of the adjusting device 33 is turned, the position of the drive shaft 29 is moved upwardly. Namely, the operational point where the drive shaft 29 and the rod 26 contact moves close to the shaft 25. Therefore, as the operational point comes close to the shaft 25, the force applied to the handle 22 and speed of the scooter decrease. The force to be applied to the handle 22 and speed of the scooter can be adjusted by the adjusting device 33.

While the invention has been explained with reference to the specific embodiment of the invention, the explanation is illustrative and the invention is limited only by the appended claims.

What is claimed is:

1. A scooter with a manual propelling system comprising:

a body where a user can stand, a steering section attached to the body, said steering section including a front shaft rotatably attached to the body and having upper and lower portions, at least one front wheel rotationally connected to the lower portion of the front shaft, and a steering rod having upper, middle and lower portions, said middle portion of the steering rod being rotationally connected to the upper portion of the front shaft, and a propelling section including a rear wheel shaft rotationally attached to the body, rear wheels fixed to the rear wheel shaft, an engaging device having a gear pivotally connected to the rear wheel shaft, and a drive shaft connected to the lower portion of the steering rod and having a rack so that when the drive shaft is moved forwardly by moving the steering rod downwardly, said rack engages the engaging device to rotate the rear wheels to thereby move the scooter forwardly, an angle of the gear relative to the rear wheel shaft being changed so that the gear always aligns perpendicular to the drive shaft.

2. A scooter according to claim 1, wherein said gear of the engaging device includes teeth extending radially outwardly of the gear to incline at angles relative to the radial direction of the gear so that when the drive shaft is moved forwardly, the teeth of the gear engage the rack of the drive shaft.

3. A scooter according to claim 2, wherein said rack of the drive shaft extends forwardly at angles relative to the longitudinal direction of the drive shaft so that the rack does not engage the teeth of the gear when the drive shaft is moved rearwardly.

4. A scooter according to claim 3, wherein said drive shaft is located above the gear of the engaging device.

5. A scooter with a manual propelling system comprising:
  a body where a user can stand,
  a steering section attached to the body, said steering section including a front shaft rotatably attached to the body and having upper and lower portions, at least one front wheel rotationally connected to the lower portion of the front shaft, and a steering rod having upper, middle and lower portions, said middle portion of the steering rod being rotationally connected to the upper portion of the front shaft,
  a propelling section including a rear wheel shaft rotationally attached to the body, rear wheels fixed to the rear wheel shaft, an engaging device connected to the rear wheel shaft, and a drive shaft connected to the lower portion of the steering rod and having a rack so that when the drive shaft is moved forwardly by moving the steering rod downwardly, said rack engages the engaging device to rotate the rear wheels to thereby move the scooter forwardly, and
  speed and force adjusting means attached to the steering rod, said speed and force adjusting means adjusting the position of the drive shaft on the steering rod.

6. A scooter according to claim 5, wherein said speed and force adjusting means includes a lever and a wire for connecting the lever and the drive shaft, the position of the drive shaft being regulated when the lever is adjusted.

* * * * *